Patented Aug. 7, 1928.

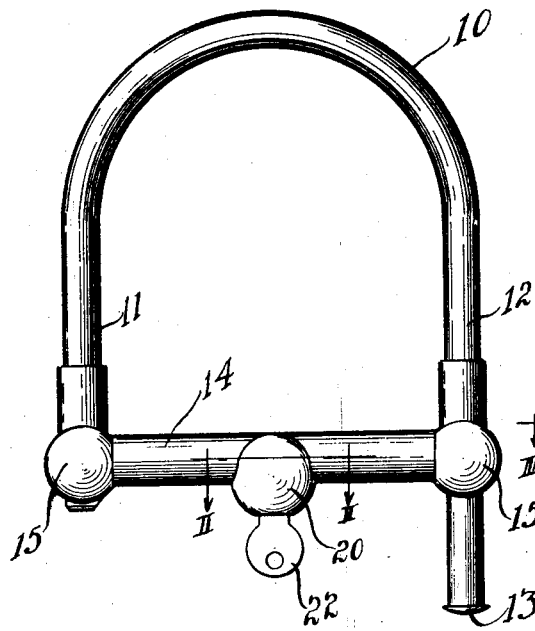
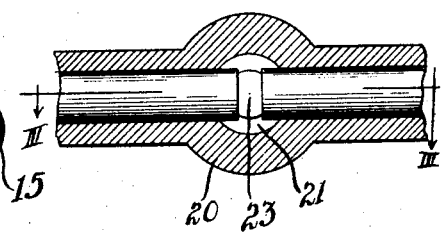
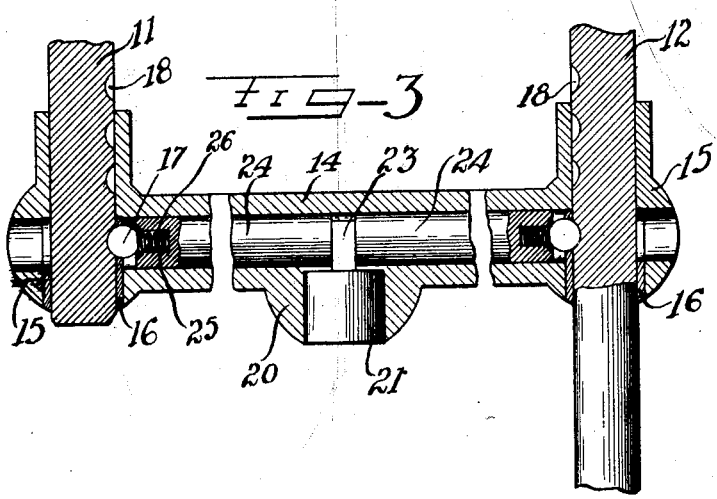

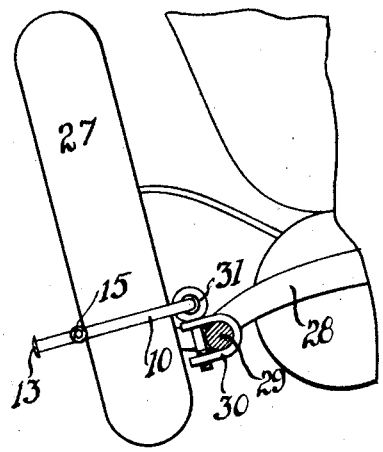
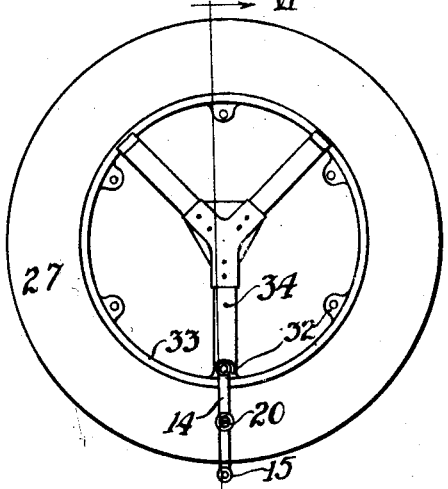
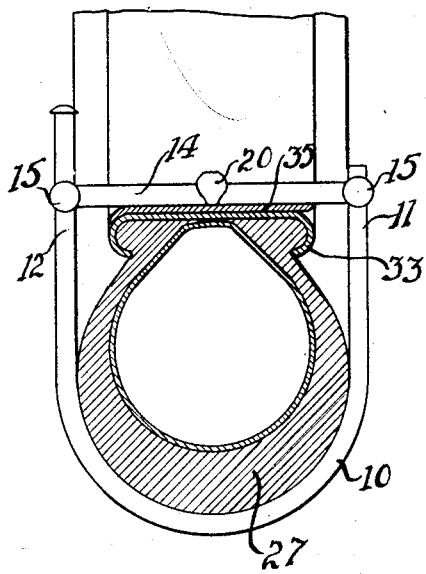
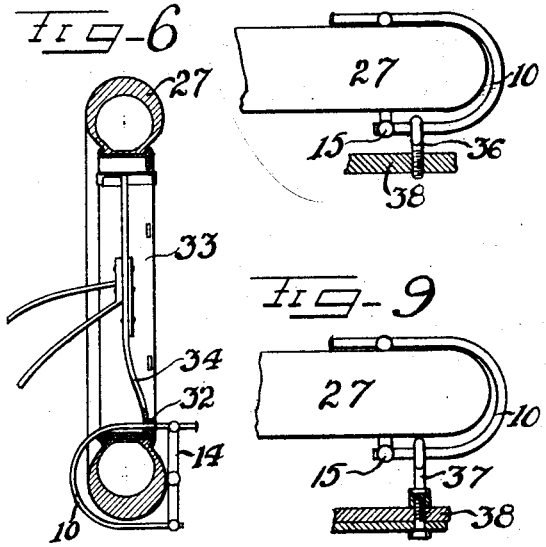
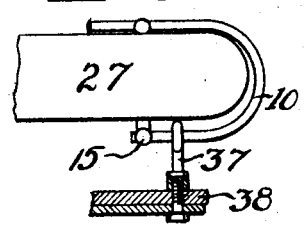

1,679,665

UNITED STATES PATENT OFFICE.

JOHN JUNKUNC, OF CHICAGO, ILLINOIS.

SPARE-TIRE LOCK.

Application filed January 27, 1927. Serial No. 163,889.

This invention relates to spare tire locks for vehicles.

It is an object of this invention to provide an improved rigid lock for encircling a spare tire when mounted on various types of tire carriers in order to prevent unauthorized removal thereof. Heretofore a number of different ways of securing tires on a carrier have been proposed such as chains encircling the tire section, tire carriers locking in expanded position, and locks forming part of a clamping lug. It will be evident that the chain is useless with open tripod type carriers and that the locking carriers and locking lugs will not prevent the removal of a tire from the rim, so that these locks are all special purpose locks, whereas my improved lock is equally applicable to different types of tire rims and carriers.

It is also an object of this invention to provide a hasp encircling a tire section with locking means simultaneously engaging both legs of the hasp and adapted to yieldingly grip said hasp legs when unlocked and to rigidly grip said legs when locked.

Other and further important objects of this invention will be apparent from the disclosures in the specification and the accompanying drawings.

This invention (in a preferred form) is illustrated in the drawings and hereinafter more fully described.

On the drawings:

Figure 1 is a plan view of the complete lock.

Figure 2 is a fragmentary section on the line II—II of Figure 1 showing the locking cam released.

Figure 3 is a section on the line III—III of Figure 2.

Figure 4 is a fragmentary side elevation of a tire and chassis with the device of this invention applied thereto and secured to the chassis.

Figure 5 is a rear view of the locking device applied to a tire on an open type tire carrier.

Figure 6 is a section on the line VI—VI of Figure 5.

Figure 7 is a cross section of an application of the lock to a rim type tire carrier.

Figure 8 is a fragmentary view of another form of mounting.

Figure 9 is a fragmentary view of still another form of mounting.

As shown in the drawings:

The locking mechanism comprises two major members, a U-shaped hasp 10 having straight legs 11 and 12 the longer leg 12 being headed over as at 13 to provide a stop for a cross bar 14 having apertured bosses 15 slidable on the straight portion of the legs 11 and 12. The bosses 15 have inserted sleeves 16 cut away to allow locking balls 17 to project into notches or detents 18 drilled in the inside of the legs 11 and 12. These sleeves 16 are intended to prevent the balls from dropping out when the cross bar is slid down against the head 13 and thus released from the shorter leg 11.

A boss 20 is formed in the center of the cross bar 14 to receive a cylinder lock 21 operated by a key 22, the lock carrying cam 23 on its inner end which acts on the adjacent ends of bars 24 slidable within the cross bar, the outer end of each bar contacting the balls to hold them in the detents 18 in the legs when the cam is turned 90° from the position shown in Figure 2.

The outer ends of these bars are preferably recessed at 25 for springs 26 which urge the balls outwardly even when the cam is in the unlocked position of Figure 2, as this yielding outward pressure causes the balls to drop into the detents and thus locates the cross bar when turning the key. Without the springs the cross bar would have to be shifted back and forth until the balls aligned with a pair of detents before the key could be turned to lock the cross bar, as with the balls retracted by an unnotched part of the legs 11 and 12 the bars 24 would contact both the balls and the cam and thus prevent turning the latter.

Figures 4 to 9 illustrate various applications of the lock. In Figure 4 is shown a side view of a tire 27 on the back of a vehicle, the frame 28 and rear cross bar 29 of which are indicated. A U-bar 30 is placed around the cross bar 29 and clamped thereto by an eye bolt 31 through which the hasp 10 of the lock is passed before encircling the tire. It will thus be seen that the tire is locked to the vehicle frame, a proceeding desirable when the tripod type of tire carrier is used.

Figures 5 and 6 disclose an alternative arrangement wherein the lock hasp 10 passes through an attached lug 32 carried by the tire rim 33 and thence through an aperture in one arm of the tripod tire carrier 34.

Figure 7 shows a method of using the lock in connection with a continuous rim or annulus type of tire carrier 35. The curved part of the hasp 10 contacts the rounded perimeter of the tire and the cross bar 14 is drawn up close to the interior of the carrier 35 to prevent rattling of the lock.

Figures 8 and 9 show the use of the lock in connection with a screweye 36 in Figure 8 and an eye bolt 37 in Figure 9, both variations being particularly adapted to secure a tire carried on the running boards to the side of the body 38.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A tire lock comprising a hasp portion adapted to encircle the tire cross section and having parallel legs with a series of notches in the inner surfaces thereof, a cross bar having apertures to admit the legs of said hasp, locking means carried by said cross bar comprising members adapted to enter the notches in said legs, a lock, means actuated by said lock adapted to hold said members in extended position in said notches, and yielding means positioned between the first mentioned members and the means holding them in extended position adapted to urge said members into said notches when said lock is released.

2. A tire lock comprising a hasp portion adapted to encircle the tire cross section and having parallel legs with a series of notches in the inner surfaces thereof, a cross bar having apertures to admit the legs of said hasp, locking means carried by said cross bar comprising balls adapted to be projected into the notches in said legs, means adapted to yieldingly project said balls, and locking means adapted to compress said yielding means to rigidly hold said balls extended.

3. A tire lock comprising a hasp portion adapted to encircle the tire cross section and having parallel legs with a series of notches in the inner surfaces thereof, a cross bar having apertures to admit the legs of said hasp, locking means carried by said cross bar comprising balls adapted to be projected into the notches in said legs, and locking means adapted to rigidly hold said balls extended.

4. A spare tire lock comprising a rigid rod shaped to encircle a portion of a tire with parallel ends, a cross bar adapted to engage the ends of said rod to complete the enclosure, a series of notches in the ends of said rod, and locking mechanism in said cross bar comprising projectable rods and springs adapted to be compressed within recesses in said rods adapted to yieldingly engage said notches when unlocked and to rigidly engage said notches when locked.

In testimony whereof I have hereunto subscribed my name at Chicago, Cook County, Illinois.

JOHN JUNKUNC.